United States Patent [19]

Durand

[11] 4,251,172
[45] Feb. 17, 1981

[54] CUTTING TOOL INSERT FOR PRECISION RADIAL MACHINING

[75] Inventor: Alfred Durand, Poissy, France

[73] Assignee: Societe A.R.A.F., Poissy, France

[21] Appl. No.: 65,846

[22] Filed: Aug. 13, 1979

[30] Foreign Application Priority Data

Aug. 25, 1978 [FR] France .............................. 78 24660
Nov. 11, 1978 [FR] France .............................. 78 33702

[51] Int. Cl.³ .................... B23B 27/08; B23B 27/16; B26D 1/14
[52] U.S. Cl. .................................. 408/228; 408/232; 408/233; 407/35; 407/40; 407/42; 407/54; 407/62; 407/115
[58] Field of Search ............... 408/228, 229, 231, 232, 408/233; 407/35, 40, 41, 42, 54, 62, 115, 48, 49, 50, 30; 29/103 A

[56] References Cited

U.S. PATENT DOCUMENTS

| | | | |
|---|---|---|---|
| 984,323 | 2/1911 | Vauclain | 408/228 |
| 2,855,811 | 10/1958 | Fried | 407/30 |
| 3,125,799 | 3/1964 | Bennett | 407/35 |
| 3,333,489 | 8/1967 | Mossberg | 408/233 |
| 3,630,204 | 12/1971 | Fishbein | 408/228 |
| 4,160,616 | 7/1979 | Winblad | 408/229 |

FOREIGN PATENT DOCUMENTS 1280479  11/1961  France .................................. 29/103 A

*Primary Examiner*—Leonidas Vlachos
*Attorney, Agent, or Firm*—Fleit & Jacobson

[57] ABSTRACT

A cutting tool insert for precision radial machining comprises two cutting faces and is adapted to be fitted in the strap of a tool holder. Said insert consists of two opposed identical frustoconical portions having a common circular base forming the median plane of the disk of which the longitudinal median plane is aligned with the axis of rotation of the tool holder and intersects with the center of the common base circle. Each of said portions has a cutting face in the median plane which is disposed symmetrically on either side of said axis; the cutting faces are obtained by cutting the relevant frustoconical portions depthwise along the median plane and bound by an inclined plane. The disk may also be made of two separate, identical portions.

6 Claims, 4 Drawing Figures

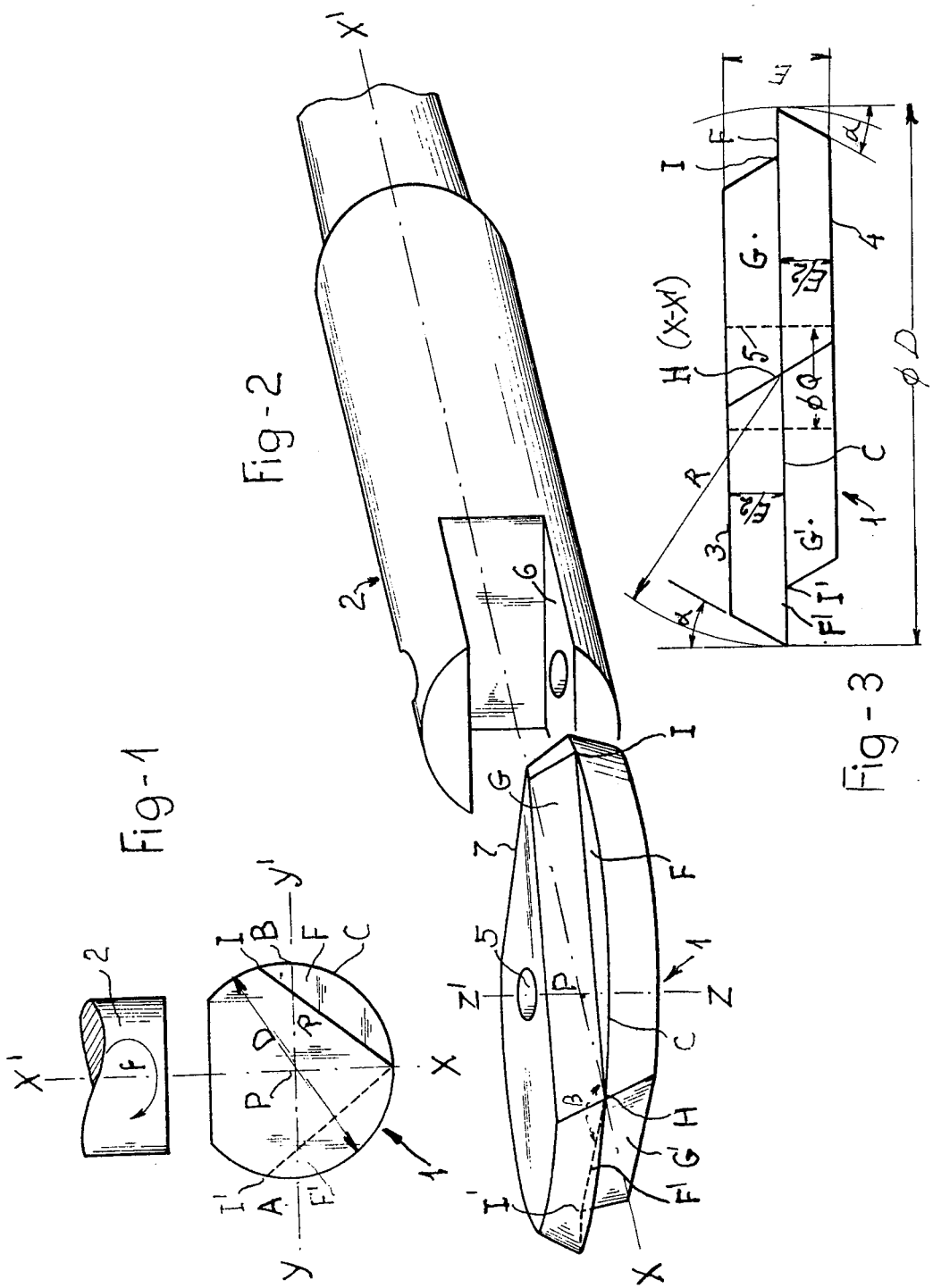

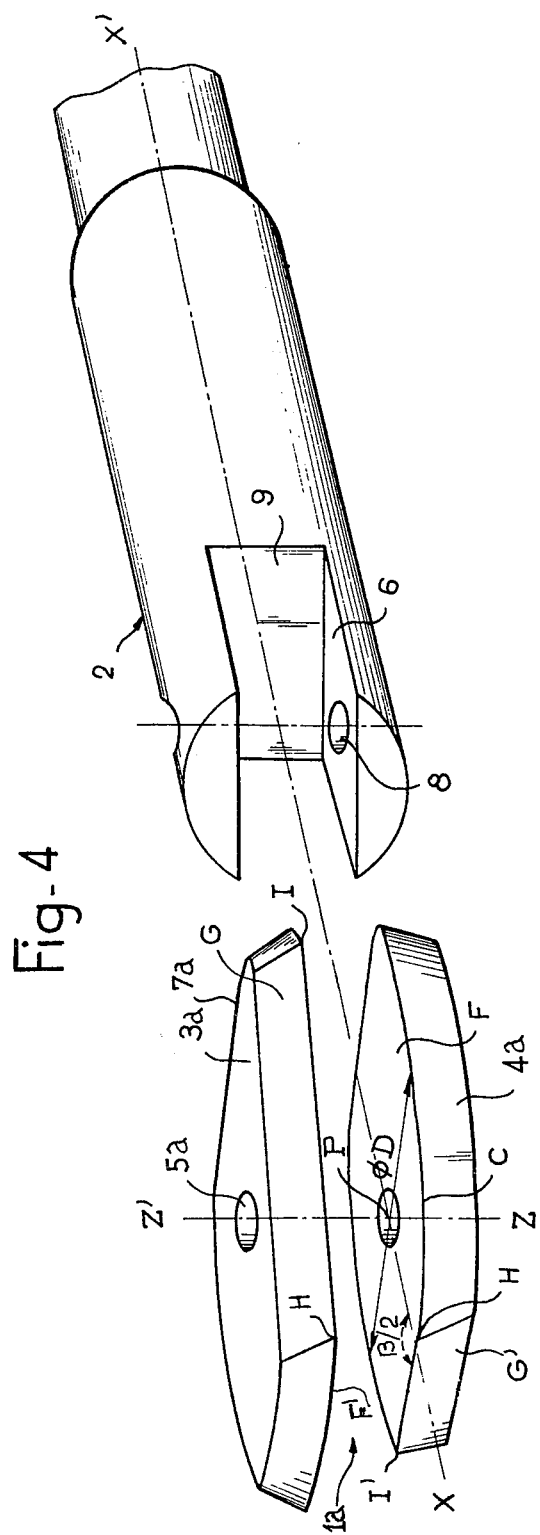

CUTTING TOOL INSERT FOR PRECISION RADIAL MACHINING

BACKGROUND OF THE INVENTION

1. Field of the Invention

This invention relates to a precision cutting insert and more particularly to an insert for ball-type milling cutter intended for duplicating or copying milling machines.

Known duplicating milling machines utilize semi-spherical milling cutters consisting of high-speed steel or tungsten carbide, constituting a single unit in the case of small diameters or tungsten carbide inserts hard-soldered to a tool holder in the case of diameters in excess of 10 to 12 mm.

Modern duplicating milling techniques, notably in the field of mock-ups, models, prototypes and press tools in the automobile and aircraft industries require semi-spherical milling cutters of increasing accuracy from the standpoint of the cutting radius. Since in many cases digit-controlled machine tools are used, the milling cutter evolution is programmed on the basis of a precision radius. In digit-controlled machines it is expected that the milling cutter, due to the high degree of precision of its radius, be capable of imparting the desired degree of precision as to the shape of the milled portion.

2. Description of the Prior Art

Known commercial milling cutters, whether of the type comprising a plurality of cutting faces when a high degree of precision is not a primary requirement, or having two cutting faces when a higher degree of precision is required, are rather inaccurate. Their manufacture is mainly dependent upon the skill of the manufacturing personnel and also of the re-sharpening personnel, this precluding any possibility of obtaining a precision of the order of one-hundredth of mm as frequently demanded, and it is extremely difficult or even impossible to sharpen such milling cutters with this degree of precision during their evolution as a consequence of the milling operations accomplished therewith, for a radial-controlled sharpening operation is based completely on the operator's skill.

Known apparatus proposed for this delicate operation are generally cumbersome and subject to operative plays, so that they are not capable of warranting with a sufficient reliability precision radii, and therefore the semispherical milling cutters thus obtained have a handicraft-like character subject to the manual skill of the operator.

From the methods now currently used it appears that:
the requirement concerning the perfect concentricity of the cutting edges generating in evolution the spherical surface (definition of the sphere) is rather problematical;
the strict observance of the radius value baffles any systematical procedure.

SUMMARY OF THE INVENTION

It is the essential object of the present invention to provide a special cutter insert of relatively low cost while avoiding the shortcomings mentioned hereinabove, this insert, when positioned on a body, constituting a high-precision ball cutter of which all the cutting points disposed on a common radius are equally spaced from the centre of said radius.

This insert, comprising two cutting faces and adapted to be mounted in a rotary tool holder, is characterized essentially in that it has the configuration of a disk formed with two opposed identical frusto-conical portions having a common circular base constituting the median plane of the disk of which the longitudinal median axis is aligned with the axis of rotation of the tool holder and intersects with the centre of the circle constituting the common base, each frustoconical portion having in the median plane a cutting face disposed symmetrically on either side of the longitudinal median axis, said cutting face being obtained by cutting a notch depthwise in the relevant frustoconical portion along said median plane and bound by an inclined plane such that the two cutting faces intersect with each other at a common point located on the longitudinal median axis so as to form with said inclined planes the chords of the base circle which extend from said common point and form an acute angle with each other, the corresponding frustoconical surface forming across the cutting face the rake angle with a plane tangent to the base circle and perpendicular to said median plane.

This insert can easily be manufactured as a single unitary piece but in the case of the upper of sizes contemplated for this insert the latter may also be made of two portions in order to facilitate its manufacture.

In this case, the insert is characterized firstly in that the two opposed frustoconical portions constituting the disk and having a common circular base are made separately. These frustoconical portions may be assembled to constitute the insert disk by simply fitting them into the common tool holder.

Other features and advantages of the invention will appear as the following description proceeds with reference to the following drawing illustrating diagrammatically two different forms of embodiment of the insert and given by way of example.

BRIEF DESCRIPTION OF THE DRAWING

FIG. 1 is a diagrammatic plane view from above showing a cutting insert according to this invention, adapted to be rotatably driven by a tool holder;

FIG. 2 is an exploded perspective view of the insert of FIG. 1 with its tool holder;

FIG. 3 is an end view of the insert of FIG. 2, when looking in the direction of its longitudinal median axis X—X'; and FIG. 4 is another exploded perspective view showing a cutting insert made of two portions, before fitting same into the tool holder.

DESCRIPTION OF THE PREFERRED EMBODIMENTS

Referring to FIG. 1 of the drawing, the circular cutting insert 1 according to the instant invention comprises a longitudinal centre line or axis X—X' coincident with that of a tool holder 2 adapted rotatably to drive the insert about this axis as shown by the arrow f.

In its longitudinal median plane, the insert 1 has a centre P located on the longitudinal median line or axis X—X' and two cutting faces F, F' disposed symmetrically in relation to said axis and intersecting with a common point H located on the base circle C having a diameter D of the insert. The cutting faces are bound by chords HI and HI' of this circle. The angle IHI' made by these chords is less than 90°, so that the endmost points I and I' of cutting faces F, F' lie beyond the transverse axis Y—Y' intersecting with the centre P and defining the half-circumference AHB of circle C.

During the rotation of the cutting insert 1 about the longitudinal axis X—X', the insert generates a half-sphere of same radius R=(D/2) as the half-circumference AHB, each point of this half-sphere lying therefore at the same distance from centre P.

Referring now to FIGS. 2 and 3, it will be seen that the insert 1 is constructed according to the principles shown in FIG. 1 by grinding and sharpening. A disk having a thickness E consists of two opposed identical frustoconical portions 3 and 4 having a common base circle C of which the diameter is equal to D, the thickness of each frustoconical portion being E/2. The two cutting faces F, F' of the frustoconical portions 3, 4 are obtained by cutting in the median plane of circle C in the insert material on the one side the upper frustoconical portion 3 and, symmetrically thereto in relation to the longitudinal axis X—X', on the other side the lower frustoconical portion 4. Each cutting face is bound depthwise by a plane G, G' making a predetermined angle with respect to the median plane of the common base in order to facilitate the removal of metal chips. The cutting faces F, F' provide at their intersection with the relevant inclined planes G, G' chords HI, HI' of the median circle C which extend from the common point H of cutting faces F, F' and G, G' and make therewith an acute angle "$\beta$", whereby the cutting faces can extend beyond the transverse median axis intersecting with the insert centre P.

The angle "$\alpha$" of the tapered surfaces of the relevant frustoconical portions 3 and 4 with respect to the plane tangent to said circle C and perpendicular to the median plane of the cutting faces F and F' constitutes the rake angle selected for the cut.

All the points located on the cutting arcs HI and HI' are equally spaced from the centre P and their radius is thus constantly equal to D/2.

The tapered surfaces of the two frustoconical portions 3, 4 as well as the two cutting faces F, F' may be obtained by turning the insert disk upside down through 180 degrees during the machining operations, in the course of the insert manufacturing procedure.

A preliminary bore 5 formed through the insert thickness E, with an axis Z—Z' intersecting with the centre P at right angles to the insert axis X—X', facilitates the grinding of the machined insert surfaces and permits of fixing this insert in the tool holder provided for this purpose with matching holes formed through its strap 6.

A flat face 7 is formed on the insert at right angles to its longitudinal axis intersecting with the centre P (FIG. 2) and opposite the point H for stabilizing the insert by keying in its tool holder 2.

The insert 1a of FIG. 4 is obtained by juxtaposing two identical separate and opposed frustoconical portions 3a, 4a having a diameter D and a thickness E/2 to constitute an insert disk when their major circular bases C are coupled together. The tapered surface of each frustoconical portion is cut depthwise on one side of the longitudinal axis X—X' of base C, so as to form a plane G, G' inclined to the base plane C, by starting from a point H of the longitudinal axis and forming a chord HI, HI' in the base circle C. This chord makes a predetermined angle $\beta/2$ with the longitudinal axis X—X'.

Each frustoconical portion comprises a bore 5a formed along a common axis Z—Z' perpendicular to the major base C and intersecting with the centre P of the insert, which lies on the longitudinal axis X—X' thereof.

A flat face 7a is formed on each frustoconical portion 3a, 4a at right angles to the axis X—X' and opposite the common point H.

The frustoconical portions 3a, 4a, when fitted into the strap 6 of tool holder 2, are secured jointly to the latter by means of a suitable fastening member (not shown). This strap 6 has also formed through its arms a bore 8 of same diameter as bore 5a. When the opposed and coupled frustoconical portions are introduced and clamped into the strap 6, their flat faces 7a engage the bottom 9 of strap 6 or may be wedged or keyed therein by using a wedging member (not shown) to prevent any untimely movement of the complete insert and a movement of its frustoconical portions in the plane C of the common base. The cutting faces F, F' are formed in the plane of the common base C of the frustoconical portions 4a and 3a in which they are bound by the chords HI of the opposite frustoconical portions 3a, and HI' of the opposite frustoconical portion 4a, respectively.

I claim:

1. A cutting tool insert for precision radial machining, comprising two cutting faces and adapted to be fitted in a rotary tool holder, wherein the insert consists of a disk having two identical opposed frustoconical portions having a common circular base forming the median plane of the disk of which the longitudinal median axis is aligned with the axis of rotation of the tool holder and intersects with the centre of the common base circle, each frustoconical portion having a cutting face in the median plane which is disposed symmetrically on either side of the longitudinal median axis, said cutting face being obtained by cutting the relevant frustoconical portions depthwise along said median plane and bound by an inclined plane, whereby the two cutting faces intersect with a common point located on said longitudinal median axis and form with said inclined planes chords of said base circle which extend from said common point and make each other an acute angle, the corresponding frustoconical surface making across said cutting face the rake angle with a plane tangent to the base circle and perpendicular to said median plane.

2. A cutting tool insert as claimed in claim 1, wherein a bore is formed at right angles to the median plane of the disk base, the bore axis being coincident with the centre of the insert.

3. A cutting tool insert as claimed in claim 2, wherein said bore, said frustoconical surfaces and the cutting faces of the two frustoconical portions are obtained by turning the insert upside down through 180° during the machining thereof by grinding and sharpening, this step being facilitated by the presence of the central bore.

4. A cutting tool insert as claimed in claim 1, wherein said disk has a flat face formed thereon at right angles to the median longitudinal axis and at its end opposite the common point of said cutting faces.

5. A cutting tool insert as claimed in claim 1, wherein said two frustoconical portions constituting the disk are made separately and subsequently assembled to form said common circular base.

6. A cutting tool insert as claimed in claim 5, wherein the coupling of the frustoconical portions for constituting said insert disk after the machining thereof is obtained by fitting said portions into the tool holder and fixing said portions therein by means of a suitable fastening member.

* * * * *